July 16, 1935.  R. J. KING ET AL  2,008,554
COMPOUNDING OF RUBBER
Filed June 12, 1931
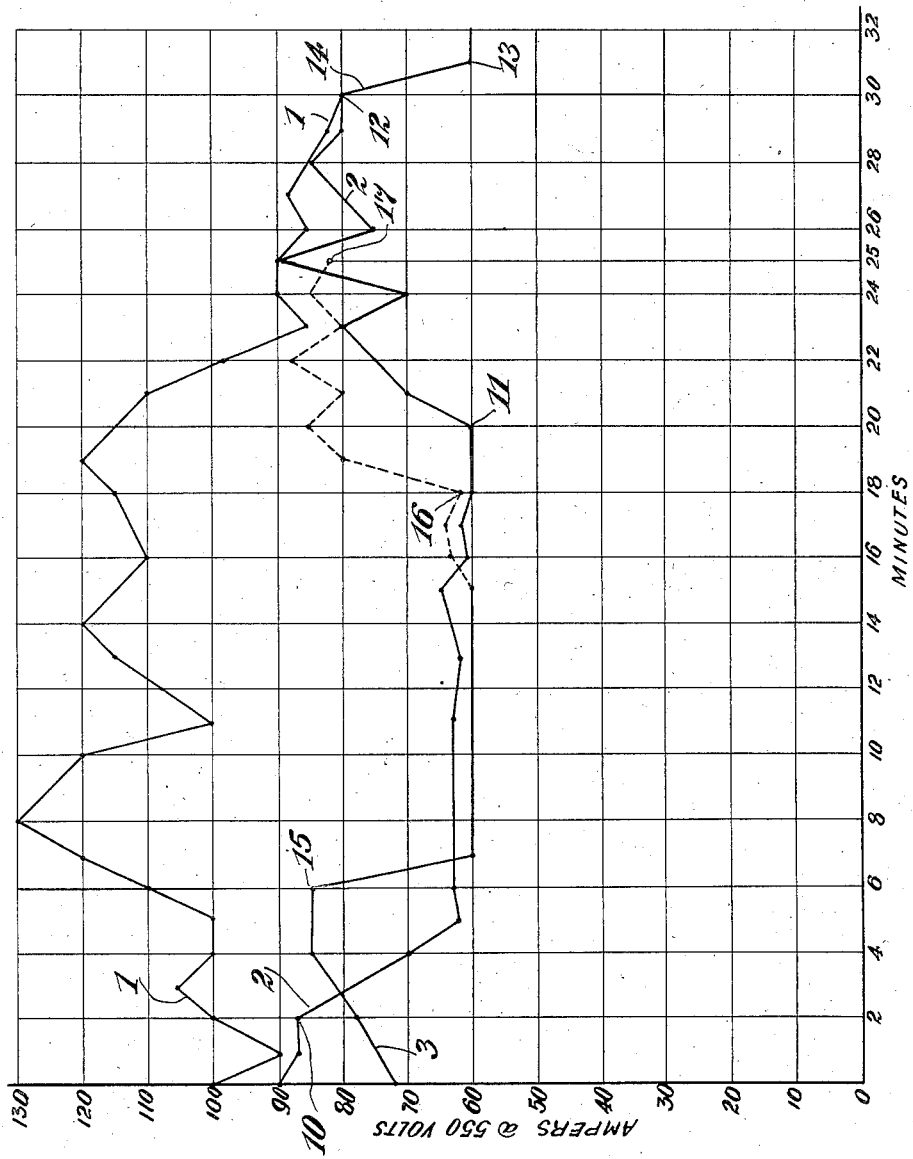
INVENTORS
Robert J. King
and Elizabeth C. King
BY Edward Thomas
ATTORNEY Patented July 16, 1935

2,008,554

UNITED STATES PATENT OFFICE 2,008,554

COMPOUNDING OF RUBBER

Robert J. King and Elizabeth C. King, Stamford, Conn., assignors to The Robert J. King Company, Inc., Stamford, Conn., a corporation of Connecticut Application June 12, 1931, Serial No. 543,768

5 Claims. (Cl. 106—23)

This invention relates to rubber and to compounding processes with compounding agents suitable for incorporation into rubber, and is herein illustrated as applied to the breaking down of rubber on the mill.

Rubber has proved a baffling material to handle on the large scale where uniform and predictable results are necessary to the efficient working of manufacturing processes and to the obtaining of standardized products. Moreover the consumption of power in the milling or breaking down of rubber has been very great. Added to this has been the irregularity of products,—this irregularity arising sometimes from variations in raw material and sometimes from minor and unobserved variations in processing the raw material. According to the present invention these and other difficulties are overcome. Other objects and advantages will hereinafter appear.

The accompanying drawing shows curves to illustrate the saving in power which results from one form of the present invention.

One embodiment of the invention is illustrated in a material of the class known as softeners, that is the materials added to rubber to facilitate the plasticizing operation or so-called breaking down or milling operation.

Example I.—One softener was prepared by heating 82 parts of an unblown steam distilled topped Mexican asphalt sufficiently to make it pumpable, say to 120° F. To this was added a mixture of 15 parts of a 36° to 38° petroleum furnace oil, and 3 parts of the sulphonic acid compound made by treating petroleum with sulphuric acid and sold under the name of Twitchell's Sulpho A, one form of which is described in German Patent No. 271,433 dated March 11, 1914 and No. 264,785 dated April 2, 1912. The petroleum furnace oil is a light petroleum oil normally acting as a poor solvent for rubber, but becoming an excellent solvent for it in the presence of the sulphonic acid compound.

When four pounds of the softener of Example 1 was added to one hundred parts of smoked sheets in the mill, the rubber apparently dissolved in the four pounds of softener, and the rubber milled smoothly.

In another test sixteen pounds of the softener were mixed with two hundred pounds of smoked sheets in a Banbury mixer. The test was operated so as to yield the same plasticizing of rubber as a blank test in the same mill. It was found that the whole plasticizing operation took less than seven minutes in the presence of the softener, against a full thirty minutes for the blank test in the absence of the softener. In another test when the same softener was added four minutes later the plasticizing operation took five minutes.

In the accompanying drawing the effective work of the softener of the first test is shown in curve 2. The minutes elapsed from starting the plasticizing operation are plotted at the bottom of the figure, the amperes consumed in driving the mill are shown at the left of the figure. The softener was added to the point 10 after the operation had proceeded two minutes. In three minutes the amperage had dropped to about 62 or 63 where is remained until the twentieth minute at 11. The amperage rose to between 80 and 90 and remained between 70 and 90 amperes until the batch was removed at 12, at the thirtieth minute. The consumption of power when the mill ran idle is shown at right of the figure at 13 as about 60 amperes. The batch of identical rubber which contained no softener yielded the curve 1, which started off at 100 amperes, and after a short drop to 90 amperes rose to 130 amperes, and did not fall again below 100 amperes until the twenty-second minute, and then slowly fell to 80 amperes when it was removed at 14 after the thirtieth minute, always taking more power than the batch of curve 2.

In curve 3 is shown the effect of adding the softener at 15 at the sixth minute. The power consumption immediately dropped to the idling level and remained near there to 16 at the eighteenth minute, when it rose to eighty amperes and remained between eighty and ninety amperes until the batch was deemed complete and was removed at 17 at the twenty-fifth minute.

The saving in horse power alone brought about by the new softener would represent a good profit in the rubber industry. But, besides that, it has been found possible to so use the softener as to reduce the milling time to the few minutes during which substantial power was required, thus enabling the capital investment in mixers to be reduced to less than a quarter of that hitherto needed. In some instances rubber has been milled in three minutes which formerly required forty-five minutes. In addition, the new softener produced from the smoked sheets used a rubber fit for the finest calendered or molded thin sheets, whereas the rubber milled without the new softener could only be used where fineness is not important, such as for packings and so-called mechanicals. Besides this the rubber so milled retains the improved properties produced by milling. Some men have described this by saying that the rubber stays milled.

*Example II.*—Seventy-five pounds of the fossil gum known as crude East India gum, containing about ten per cent of bark and other adventitious material, was agitated with 22 pounds of the same furnace oil at a temperature of about 250° F. Though no true solution seemed to form, the gum was in suspension, fluxed with the oil, and was filtered at the same temperature. The residues in the filter were washed twice with the hot oil to be used in the next bath.

To the hot filtrate was added three pounds of the Sulpho A.

The resulting product formed a solid resin, usable as a softener as was the first softener. It had the property of tending to coat the milling rolls. This softener even more than the softener of Example I speeds milling and enables grades of rubber, hitherto deemed poor, to be advantageously used. It does not tend to separate out from the rubber upon vulcanizing, nor does its bloom out. It can be used to mill and plasticize incipiently vulcanized rubber, such as so-called scorched stock, and partially vulcanized mold scrap. Other conspicuous properties are that the rubber is more than ordinarily plastic while hot but when cold has full natural strength and toughness. The great plasticity while hot enables the manufacturer to avoid scorching, to calender or tube at high speeds and to run accurately to gauge, while the cold toughness insures finished goods of highest tensile strength, wear, resistance, etc.

Moreover, the low internal friction of rubber stock using the present softeners keeps the batches low in temperature during mixing, sometimes 50° F. lower than hitherto possible, thus preventing the premature vulcanizing called scorching, especially in poorly cooled mills.

Raw rubber which has had incorporated into it 2 to 10% of softener according to Example II, and then is compounded with standard curatives and vulcanized, has been found to be replastic, i. e. can be more or less readily, in proportion to the per cent of the material of Example II, brought again into plastic condition by milling,—a very marked difference being noted from the behavior of similar vulcanized rubber not containing Example II. Moreover rubber treated with the softener of this example is more easily reclaimed than is rubber treated in the ordinary ways.

One advantage of the softener of this example is that the rubber softened by it, may be wholly milled in a Banbury mixer, thus eliminating much of the labor involved in ordinary milling and also eliminating the hazard involved in manual cutting across the rubber on the mill and in folding it in by hand. The softener of the present invention does away with the need of the rubbing out action on the rubber hitherto required and effected by two opposing rolls turning at different speeds.

*Example III.*—Forty-six pounds of the crude East India gum and fifty pounds of the furnace oil were heated and filtered as before and while still hot but below the boiling point of the alcohol used, three pounds of the Sulpho A and one pound of commercial secondary hexyl alcohol (boiling between 275° F. and 297° F. or with a narrower range), were added.

The resulting product was a viscous liquid, effective as a softener and not coating the rolls in milling.

It is found that these softeners, especially the softener of Example II, produce a rubber having more adhesion to metal than does ordinary rubber. They are especially useful, therefore, for making an insulated wire to stand abuse.

It was found satisfactory to use about 9% of these softeners on reclaimed rubber, and 3% to 6% on new rubber. It has been found possible to mill for many hours, far beyond any useful amount, a batch of rubber containing a powerful accelerator so softened with the softeners of the present invention, although a parallel batch softened with standard softeners started to scorch or vulcanize in on the mill in twelve minutes.

While the softeners have been described above as completed and ready for mixing with rubber the readily miscible ingredients may be mixed at the factory. Some of the ingredients may be used in other combinations to yield useful products with rubber and rubber-like materials.

Having thus described certain embodiments of the invention, what is claimed is:

1. The improvement in the compounding of rubber which comprises adding to raw rubber in a substantially unworked condition a small amount of a non-liquid softener composition, said composition being made up for the most part of other softener constituents and containing a small amount of an oil soluble sulfonated petroleum oil amounting to a fraction of a percent on the rubber, and said composition also containing a small percentage of hydrocarbon oil, and working the rubber to convert it into a plastic condition, said composition enabling the rubber to be readily plasticized and made ready for compounding without preliminary mastication and with an important saving in the time and power required.

2. The improvement in the compounding of rubber which comprises adding to raw rubber in a substantially unworked condition a small amount of a non-liquid softening composition, said composition being made up for the most part of other softener constituents and containing a small amount, representing a fraction of a percent on the rubber, of an oil soluble sulfonated oil, said composition enabling the rubber to be readily plasticized and converted into a plastic mass ready for compounding with a material saving in time and power required, working the rubber to convert it into a plastic mass suitable for compounding, and incorporating the compounding ingredients therewith.

3. The improvement in the compounding of rubber which comprises adding to raw rubber in a substantially unworked condition a small amount of a non-liquid softening composition, said composition being made up for the most part of other softener constituents and containing a small amount, representing a small fraction of a percent on the rubber, of an oil soluble sulfonated petroleum oil, said composition enabling the rubber to be readily plasticized and converted into a plastic mass ready for compounding with a material saving in time and power required, working the rubber to convert it into a plastic mass suitable for compounding, and incorporating the compounding ingredients therewith.

4. The improvement in the compounding of rubber which comprises adding to raw rubber in a substantially unworked condition a small amount of a softening composition, said composition being made up for the most part of other softener constituents and containing a small amount, representing a fraction of a percent on the rubber, of an oil soluble sulfonated oil, said composition enabling the rubber to be readily plasticized and converted into a plastic mass ready for compounding with a material saving in time and power required, working the rubber to convert it into a plastic mass suitable for compounding, and incorporating the compounding ingredients therewith.

5. The improvement in the compounding of rubber which comprises adding to raw rubber in a substantially unworked condition a small amount of a softening composition, said composition being made up for the most part of other softener constituents and containing a small amount, representing a small fraction of a percent on the rubber, of an oil soluble sulfonated petroleum oil, said composition enabling the rubber to be readily plasticized and converted into a plastic mass ready for compounding with a material saving in time and power required, working the rubber to convert it into a plastic mass suitable for compounding, and incorporating the compounding ingredients therewith.

ROBERT J. KING.
ELIZABETH C. KING.